United States Patent [19]

Aoki et al.

[11] Patent Number: 5,406,392
[45] Date of Patent: Apr. 11, 1995

[54] IMAGE RECORDING APPARATUS USING MULTIPLE RECORDING OF THE SAME IMAGE INFORMATION TO OBTAIN HIGH RESOLUTION AND TONALITY

[75] Inventors: Takao Aoki, Abiko; Yuji Akiyama, Yokohama, both of Japan

[73] Assignee: Canon Kabushiki Kaisha, Tokyo, Japan

[21] Appl. No.: 138,379

[22] Filed: Oct. 20, 1993

Related U.S. Application Data

[63] Continuation of Ser. No. 839,075, Feb. 24, 1992, abandoned, which is a continuation of Ser. No. 436,762, Nov. 15, 1989, abandoned.

[30] Foreign Application Priority Data

Nov. 15, 1988 [JP] Japan ................................ 63-287945

[51] Int. Cl.⁶ ............................................. H04N 1/46
[52] U.S. Cl. ..................................... 358/502; 347/43
[58] Field of Search ............................ 358/500–504, 358/296, 298; H04N 1/04; 340/76 PH, 140 R; 347/43

[56] References Cited

U.S. PATENT DOCUMENTS

| | | | |
|---|---|---|---|
| 4,528,576 | 7/1985 | Koumura et al. | 358/75 |
| 4,635,078 | 1/1987 | Sakurada et al. | 346/140 R |
| 4,663,662 | 5/1987 | Sekizawa et al. | |
| 4,672,432 | 6/1987 | Sakurada et al. | 358/75 |
| 4,686,538 | 8/1987 | Kouzato | 346/1.1 |
| 4,718,040 | 1/1988 | Ayata et al. | 358/75 |
| 4,786,976 | 11/1988 | Takao et al. | 358/456 |
| 4,878,125 | 10/1989 | Katayama et al. | 358/456 |
| 4,893,188 | 1/1990 | Murakami et al. | 358/456 |
| 4,930,007 | 5/1990 | Sugiura et al. | 358/298 |
| 4,930,018 | 5/1990 | Chan et al. | 358/298 |
| 4,952,942 | 8/1990 | Kanome et al. | 358/502 |
| 4,975,786 | 12/1990 | Katayama et al. | 358/459 |
| 5,142,374 | 8/1992 | Tajika | 358/298 |
| 5,252,992 | 10/1993 | Fukushima et al. | 347/43 |

FOREIGN PATENT DOCUMENTS

| | | |
|---|---|---|
| 0272147 | 6/1988 | European Pat. Off. . |
| 3415775 | 10/1984 | Germany . |
| 3415778 | 10/1984 | Germany . |

OTHER PUBLICATIONS

"Hardcopy Reproduction of Color Videotex Images by Means of Trilevel Dot Space Modulation and Ink Jet Printing" Journal of Imaging Technology, vol. 14, No. 3, Doering, et al., Jun. 1988.

"Half-Toning Using Ink-Jet" Part 1, *Algorithm of Discretization.*

Primary Examiner—Edward L. Coles, Sr.
Assistant Examiner—Kim Yen Vu
Attorney, Agent, or Firm—Fitzpatrick, Cella, Harper & Scinto

[57] ABSTRACT

An image recording apparatus includes an input unit for inputting image data; a binarization unit for generating a plurality of binarized data by performing a plurality of binarization processings of the image data inputted from the input unit; and a recording unit for performing a plurality of recording processings relative to the same input image data by using the plurality of binarized data generated by the binarization unit.

13 Claims, 17 Drawing Sheets

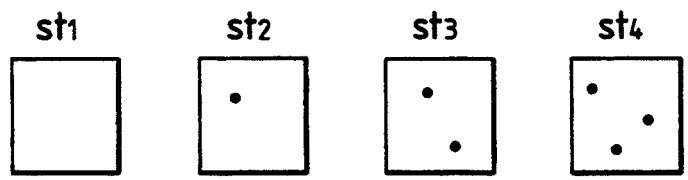
FIG. 9A
FIG. 9B
FIG. 10
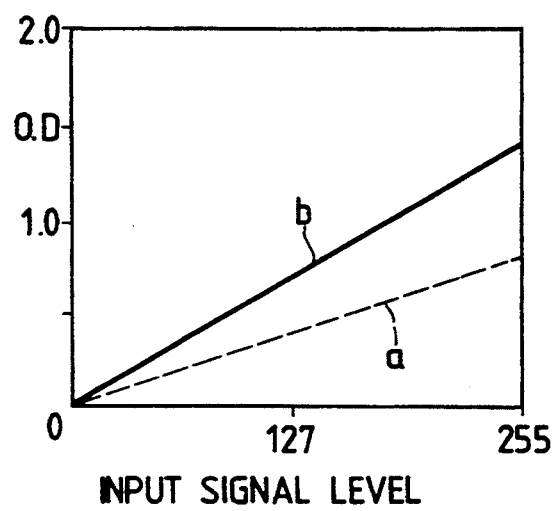

IMAGE RECORDING APPARATUS USING MULTIPLE RECORDING OF THE SAME IMAGE INFORMATION TO OBTAIN HIGH RESOLUTION AND TONALITY

This application is a continuation of application Ser. No. 07/839,075, filed Feb. 24, 1992, now abandoned, which was a continuation of application Ser. No. 07/436,762, filed Nov. 15, 1989, now abandoned.

BACKGROUND OF THE INVENTION

1. Field of the Invention

The present invention relates to an image recording apparatus for recording images, and more particularly to an image recording apparatus capable of recording halftone-processed images.

2. Related Background Art

As an image recording apparatus for recording images, there are known ink jet recording apparatus, thermal transfer recording apparatus and the like. The halftone representation method used for these recording apparatus is sub-divided mainly into a dot density control method wherein the number of fixed size dots per unit area is controlled, and a dot diameter control method wherein the size of a dot is controlled.

Since the dot diameter control method has some limitation depending upon its recording method, the dot density control method is generally used. One typical binarization method for halftone representation used with the dot density control method is an ordered dithering method. This method, however, is associated with the problem that the number of grey levels depends upon the matrix size. Specifically, if the matrix size is increase large in order to make the number of grey levels, the size of one record pixel made from the matrix, also becomes large, thereby degrading deteriorate the image resolution.

Another typical binarization method is a conditional determination type dithering method such as an error diffusion method. In this method, the threshold value is changed on the basis of the peripheral pixels, of an input pixel or a dither signal is added, whereas in the above-described ordered dithering method, an unconditional determination type dithering is used, wherein a threshold value independent of the input pixel is used in binarization.

The conditional determination type dithering method, typically the error diffusion method, affords good compatibility between tonal rendition and resolution. In addition, if the original image is a print image, a moiré and pattern rarely occurs to the recorded image.

The error diffusion method, however, has the problem that granular noise becomes conspicuous at the light portion of a processed image. Granular noises become more conspicuous for the case of a recording apparatus having a low (e.g., lower than 300 dpi) recording density. The assignee of the present invention has filed U.S. patent application Ser. No. 289,017 (application date Dec. 23, 1988), now U.S. Pat. No. 4,975,786, which discloses a method of reducing granular noise caused by the processing of the error diffusion method by not recording a dot of a low density data.

In order to make granular noise visually not conspicuous, there is known an ink jet recording apparatus of the type wherein are mounted two recording heads, one for jetting out light ink and the other for dark ink, whereby the light to halftone portion of an image is formed with recording dots of light ink, and the halftone to dark portion is formed with dark ink. In this case, however, there arise the problems that the image signal processing algorithm becomes complicated, a pseudo contour is likely to be generated because of discontinuity of smooth change of toner rendition at switching points between light and an dark inks, and unnatural image is produced because of change in granular noise and color tone at the switching points.

The above problems will become more serious if the reflection density of recording dots of light and dark inks is maintained within a narrow tolerance.

There is also proposed an ink jet recording apparatus of the type that there are mounted two recording heads, one having small diameter nozzles and the other large diameter nozzles, wherein the light to halftone portion of an image is recorded with small diameter dots, and the halftone to dark portion with large diameter dots, to thereby make granular noise not conspicuous. This ink jet recording apparatus is associated with the similar problem that a psuedo-contour is likely to be generated at the switching points between small and large dots.

SUMMARY OF THE INVENTION

It is an object of the present invention to provide an image recording apparatus capable of eliminating the disadvantages of the prior art, and recording an image of smooth tonal rendition by preventing granular noise from becoming conspicuous at the light portion of an image, and preventing psuedo-contours from being generated.

In order to achieve the above object, the image recording apparatus according to a preferred embodiment of this invention comprises input means for inputting image data, binarizing means for performing a plurality on binarization processings of the image data inputted from said input means and generating a plurality of sets of binarized data; and recording means for performing a plurality of recording processings of the same input image data by using said plurality of binarized data generated by said binarizing means.

It is another object of the present invention to provide an image recording apparatus for recording a full color image, capable of recording a full color image with a considerably improved image quality particularly at the highlighted portion, by performing with light ink a plurality of recording processings of cyan and magenta data which might otherwise make granular noise conspicuous.

It is a further object of the present invention to provide an image recording apparatus capable of preventing a psuedo-contour form being generated, by using either dark or light ink for a plurality of color data so that the same-color data are not recorded with both dark and light inks, which otherwise might result in a psuedo-contour.

It is another object of the present invention to provide an image recording apparatus capable of performing the same quantization processing on different color data, thereby simplifying the hardware arrangement or computer programs.

The other objects, features and advantages of the present invention will become apparent from the following detailed description of the preferred embodiments when read in connection with the accompanying drawings.

BRIEF DESCRIPTION OF THE DRAWINGS

FIGS. 9A and 9B illustrate recorded dots according to the prior art and the embodiment of the invention FIG. 10 shows the input/output characteristics of a cyan image in the apparatus shown in FIG. 1;

DETAILED DESCRIPTION OF THE PREFERRED EMBODIMENTS

First Embodiment

Figure 1:
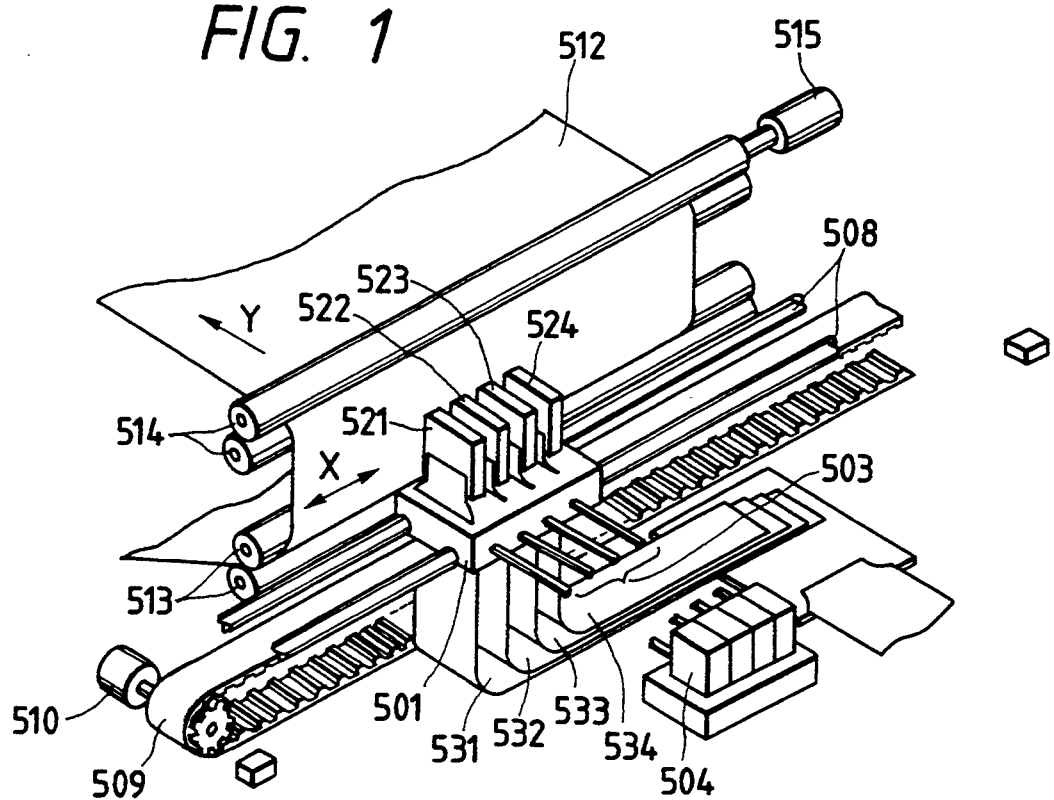
FIG. 1 is a perspective view of a full color ink jet recording apparatus of a carriage moving type according to a first embodiment of this invention.

FIG. 1 is a perspective view of a full color printer of a carriage moving type using a bubble jet recording method, according to the first embodiment of this invention.

Referring to FIG. 1, recording heads 521 to 524 each having a multi-nozzle (e.g., an array of multiple 128 nozzles) are disposed on a carriage 501. The recording heads 521 and 522 jet out cyan and magenta inks of low density, whereas the recording heads 523 and 524 jet out yellow and black inks of high density. The recording heads are supplied with inks from ink tanks 504 via flexible pipes 503, and supplied with drive signals via flexible insulating belts 531 to 534 in which a plurality of wires are embedded. The carriage 501, mounted on two guide rails 508, is reciprocally moved in the X direction to perform the main scan, by driving an endless belt 509 coupled to the carriage 501 with a pulse motor 510. A recording sheet 512 extended between roller pairs 513 and 514 is fed in the Y direction to perform the sub scan, by moving the roller pair 514 with a pulse motor 515. A full color image is thereby recorded on the recording sheet 512 with inks jetted out from the recording heads 521 to 524.

In this embodiment, the recording paper is not fed by one line immediately after one line of recording, but instead carriage is again moved to perform a main scan so that a multiple recording (twice) is carried out.

This multiple recording is carried out by using light ink, cyan and magenta. In each of two recording operations, the recording dots at a light image portion on the recording sheet are regulated so as not be superpose upon one another, or so as to make the superposition small, as will be described in detail later. Recording with yellow and black inks of high density is performed only once. The reason is that granular noise is not visually conspicuous if yellow ink is used at the light portion of an image, and if black ink is not used usually at the light portion of a full color halftone image.

According to this embodiment, cyan and magenta inks of low density are used for the multiple recording while controlling the recording dots so as not to be superpose upon another. Therefore, granular noise is not conspicuous as compared with the case where ink of high density is used once in recording a dot.

Since yellow and black inks are not used for the multiple recording, the amount of ink on the recording sheet can be reduced so that unevenness or bleeding of an image can be avoided which might be caused when inks are used in excess of the limit of the ink absorbing ability of the recording paper.

Figure 2:
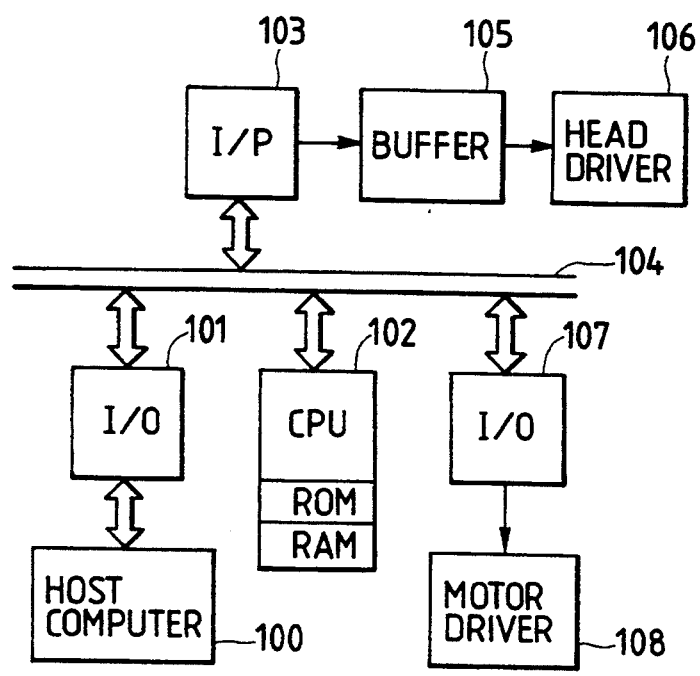
FIG. 2 is a block diagram showing the control circuit of the apparatus shown in FIG. 1.

FIG. 2 is a block diagram of the control circuit for controlling the ink jet printer shown in FIG. 1. A host computer 100 supplies three color image signals (each color consists of 8 bits), of red (R), green (G) and blue (B), to an input/output interface 101. Instead of the host computer 100, an image reader may be provided which generates R, G and B three color digital image signals by reading an original image. The image reader is well known in the art so that the detailed description therefor is omitted. A CPU 102 for controlling the whole apparatus has a ROM storing control programs and the like and a RAM used as a working area. Reference numeral 103 represents an image processor which performs various image signal processings, and 104 represents a bus line. A buffer 105 temporarily stores binary data of the four color yellow (Y), magenta (M), cyan (C) and black (K) outputted from the image processor 103. Reference numeral 106 represents a head driver for driving the recording heads shown in FIG. 1. When one line binary data for Y, M, C, and K four colors are stored in the buffer 105, the head driver controls the dot on/off in accordance with the binary data to thereby record a full color image. Reference numeral 108 represents a motor driver which controls the carriage drive motor and recording sheet feed motor, and reference numeral 107 represents an input/output interface.

CPU 102 shown in FIG. 2 executes the control of fetching R, G and B three color image data from the host computer 100, the control of sequentially sending the fetched image data to the image processor, and the control of driving the motor driver 108.

Figure 3:
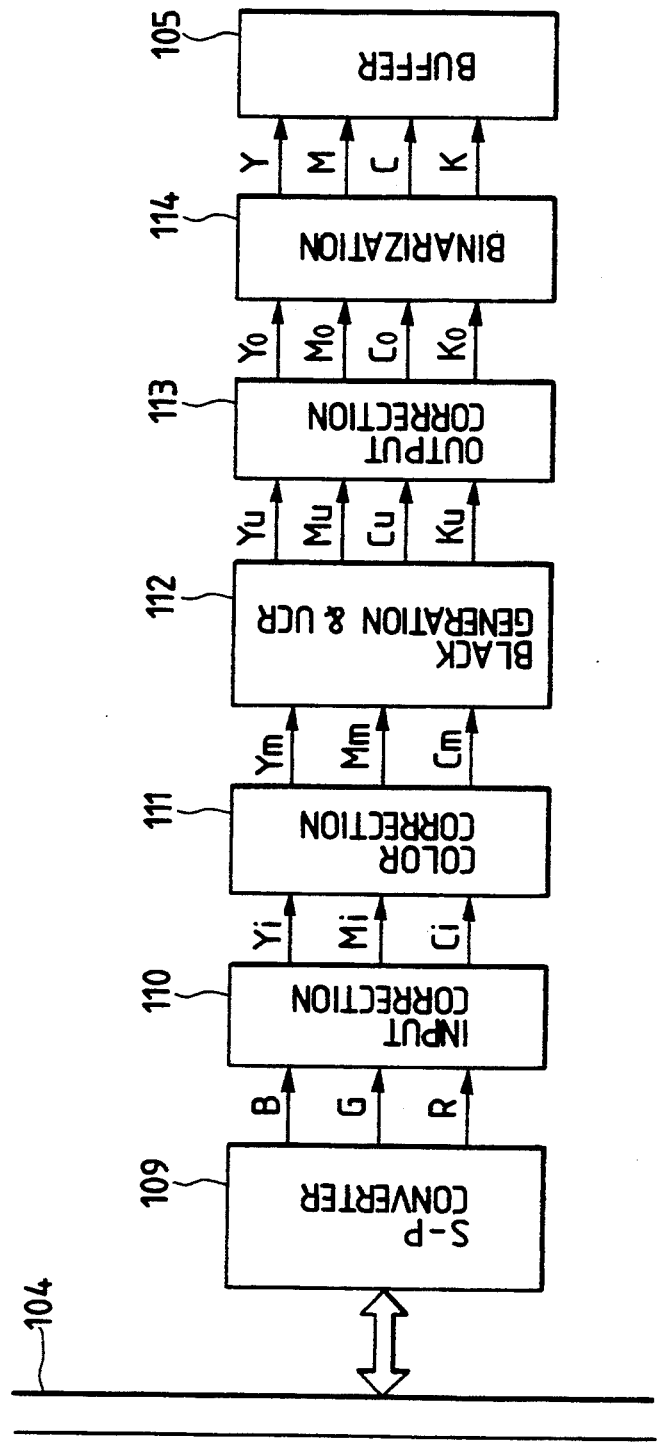
FIG. 3 is a block diagram of the image signal processing unit of the apparatus shown in FIG. 1.

FIG. 3 is a block diagram showing the detail of the image processor shown in FIG. 2. B, G and R signals each having 8 bits are sequentially inputted via the bus line 104 to the serial-parallel (S-P) converter 109. Serial R, G and B three color data sequentially inputted to the S-P converter are converted into parallel data which are sent to an input correction unit 110. The input correction unit 110 converts the brightness signals of the original image into image density signals, and converts the three color signals into complementary color signals Y, M and C. Next, a color correction unit 111 performs a color correction in order to reproduce color with high fidelity by correcting the characteristics of the original reading system and the ink spectral characteristics. Then, a black generation and UCR unit 112 generates a black (K) signal from Y, M and C three color signals, and performs an under color removal (UCR) to remove the Y, M and C components corresponding to K signal.

Next, an output correction unit 113 corrects the gamma characteristics of Y, M, C and K four color signals. Thereafter the multilevel signal is sent to a binarization processing unit 114 where each multilevel signal of Y, M, C and K color is binarized by the error diffusion method.

Figures 6A, 6B, 7:
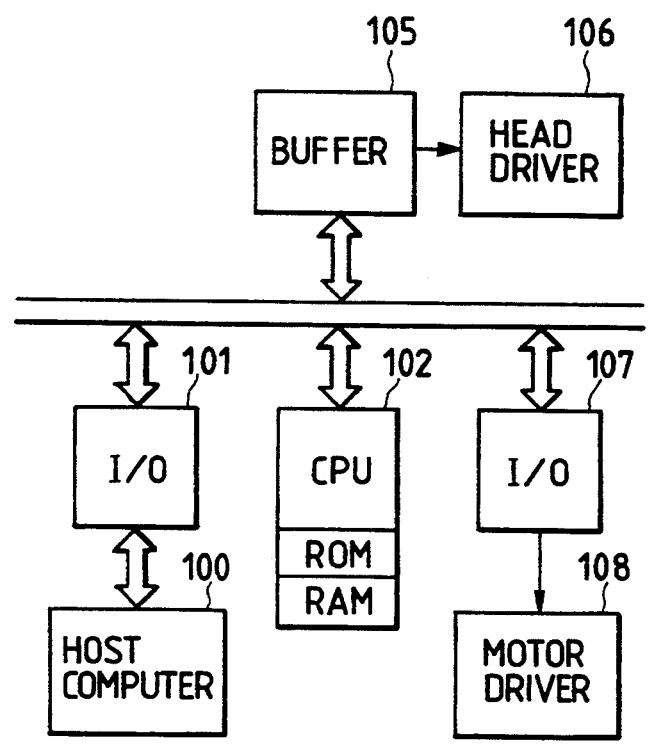
FIGS. 6A and 6B show examples of error diffusion matrixes.
FIG. 7 is a block diagram showing a modification of the control circuit of the apparatus shown in FIG. 1.

The binarization processing unit 114 performs the first binarization processing of the inputted cyan and magenta image data by the error diffusion method using an error diffusion matrix shown in FIG. 6A. Then, the second binarization processing of the same inputted image data is performed by the error diffusion method using an error diffusion matrix shown in FIG. 6B. The error diffusion matrices shown in FIGS. 6A and 6B differ in the weighting for distributing errors to the peripheral pixels. "X" shown in FIGS. 6A and 6B represents a pixel now concerned (or object pixel).

By using different error diffusion matrices in the first and second binarization processings, it becomes possible to obtain different binary data from the first and second binarization processings. Therefore, superposition of image recording dots can be prevented.

Figure 4:
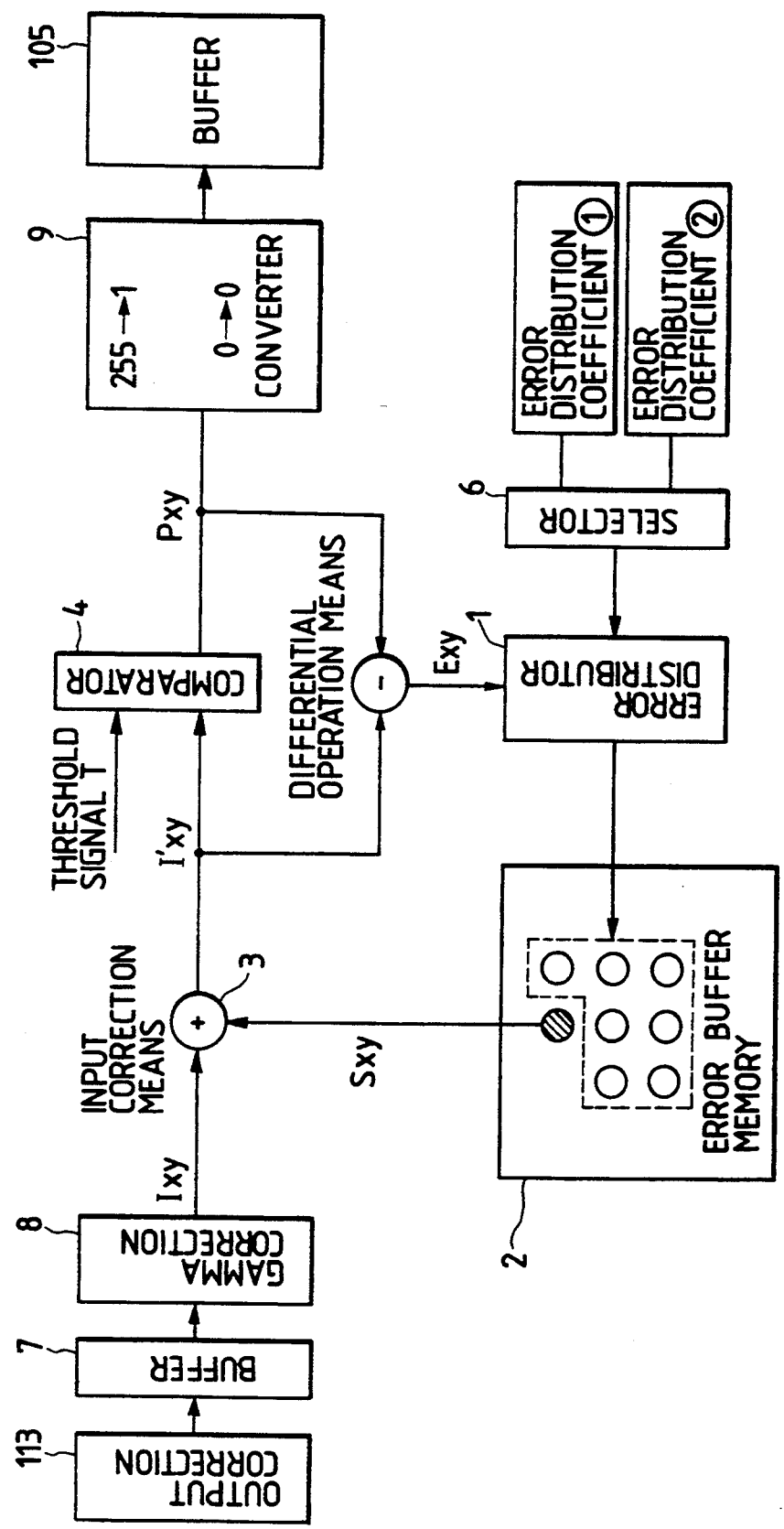
FIG. 4 is a block diagram showing the processes by the error diffusion method carried out in the binarization processing unit shown in FIG. 3.

FIG. 4 shows the detail of the binarization processing unit 114 shown in FIG. 3. A circuit like that shown in FIG. 4 is provided for each color signal, of Y, M, C and K, outputted from the output correction unit 113. For the purpose of simplicity, the circuit for only one color is shown in FIG. 4.

The image data outputted from the output correction unit 113 are stored in a buffer 7 which can store at least one line of image data.

Figure 5A:
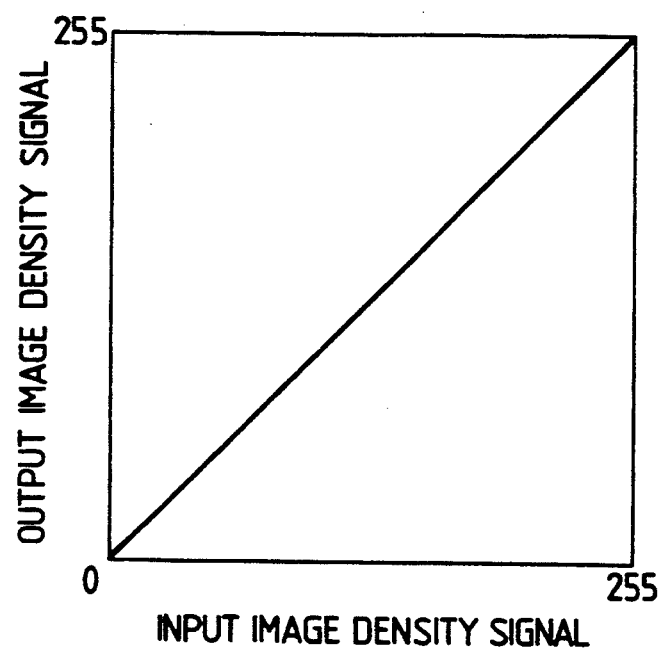
FIGS. 5A and 5B show gamma correction tables.
Figure 5B:
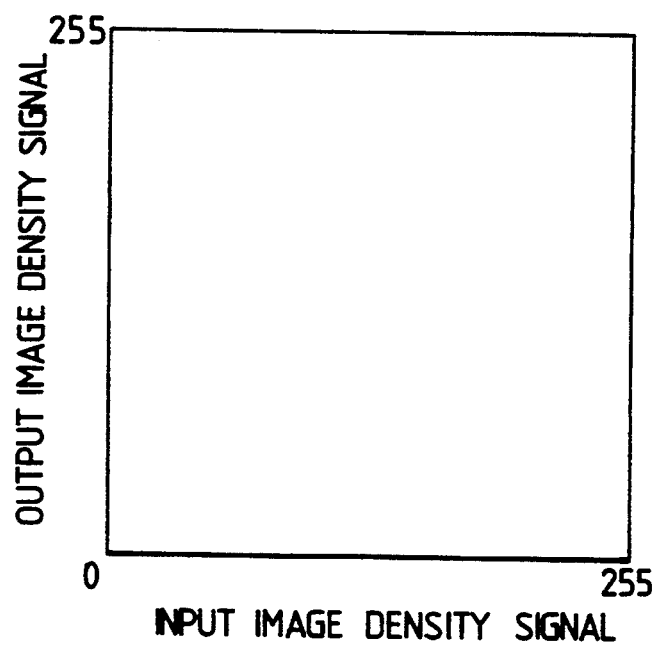

The image data outputted from the buffer 7 are sent to a gamma correction circuit 8 where the output data are determined by output gamma correction tables shown in FIGS. 5A and 5B.

In this embodiment, the image data stored in the buffer 7 are subjected to binarization processings twice. The output gamma correction table a shown in FIG. 5A is used for C and M image data both for the first and second binarization processings. For Y and K image data, the output gamma correction table R shown in FIG. 5A is used at the first binarization processing, and the output gamma correction table b shown in FIG. 5B at the second. A selector 6 alternately selects the error diffusion matrices shown in FIGS. 6A and 6B.

The output gamma correction tables shown in FIGS. 5A and 5B will be described. The output gamma correction table b outputs an image density signal of 0 for all input signals. As a result, the image density signal of Y and K for the second binarization processing is converted by the output gamma correction table b to 0 so that the recording apparatus generates no dot for these Y and K image data. The output gamma correction table a outputs the input image data as it is.

The error diffusion method two-dimensionally calculates accumulated errors of the input and output pixels. Binarization errors $E_{xy}$ at the periphery of the input image data $I_{xy}$ (8 bit multilevel signal) are weighted by an error distributer 1 by multiplying them by error distribution coefficients $K_{kl}$ of the error diffusion matrices, to thereby calculate the accumulated errors $S_{xy}$ which is given by the following equation (the error distribution coefficients in the error diffusion matrices shown in FIGS. 6A and 6B are alternately selected by the selector 6):

$$S_{xy} = (1/\Sigma K_{kl}) \Sigma K_{kl} \cdot 1 E_{x-k,y-l}$$

(where k and l are coordinate values in the diffusion matrix)

Next, the accumulated errors $S_{xy}$ are substituted into $I_{xy}$ at an input correction means 3 to obtain correction values $I'_{xy}$.

The error distribution coefficients $K_{kl}$ are expressed by using, for example, the error diffusion matrix shown in FIG. 6A as in the following:

$$K_{kl} = \begin{bmatrix} & X & 5/21 \\ 3/21 & 5/21 & 3/21 \\ 1/21 & 3/21 & 1/21 \end{bmatrix}$$

where X is a pixel now concerned (or objective pixel).

The correction values $I'_{xy}$ are expressed as:

$$I'_{xy} = I_{xy} + S_{xy}$$

The correction value $I'_{xy}$ added with the error generated during binarization of adjacent image data, is compared with a threshold signal T (T=127) at a comparator 4. If $I'_{xy}$ is larger than T, the comparator 4 outputs 255 as a $P_{xy}$, whereas if $I'_{xy}$ is smaller than T, it outputs 0 as a $P_{xy}$. A converter 9 converts a $P_{xy}$ of 255 into 1, which is outputted to a buffer 105 as the binary data.

The error $E_{xy}$ obtained by a differential operation means 5 is expressed by:

$$e_{xy} = I'_{xy} - P_{xy}$$

In the above description, the processes by the image processor 103 are carried out by using hardware. In the following, there will be described image processing carried out by CPU 102.

FIG. 7 shows a modification of the control circuit for controlling the ink jet printer shown in FIG. 1. Like elements to those shown in FIG. 1 are represented by identical reference numerals. In the control circuit shown in FIG. 7, CPU 102 also performs the processings executed by the image processor shown in FIG. 1.

Figure 8:
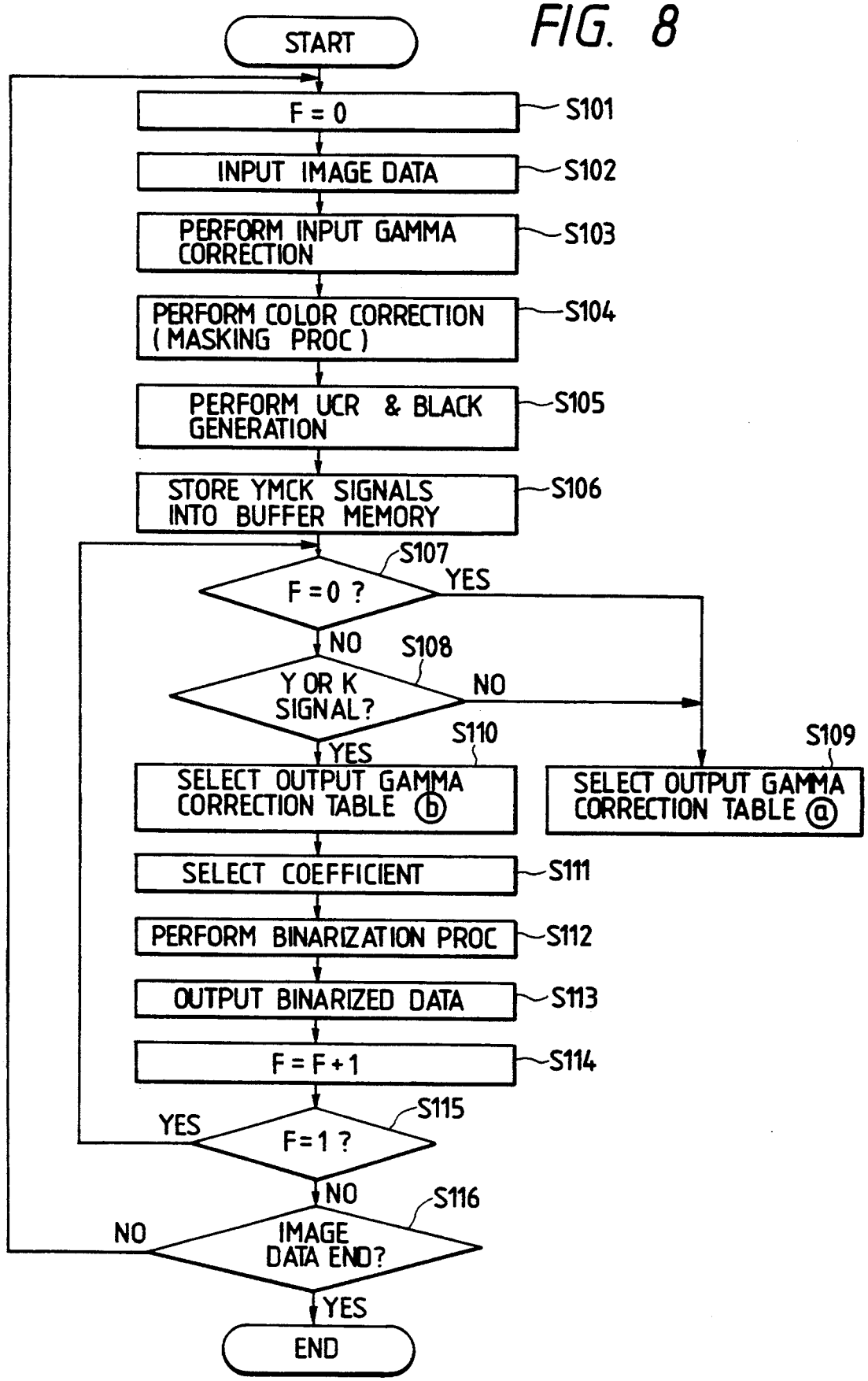
FIG. 8 is a flow chart illustrating the image signal processing executed by the CPU shown in FIG. 7.

FIG. 8 is a flow chart showing the control of image signal processing executed by CPU 102. This flow chart contents are stored in ROM.

First, a condition selection signal is reset at step S101. B, G and R image signals sent from the host computer 100 are inputted at step S102, and B, G and R brightness signals are converted into Y, M and C image density signals at step S103. A color correction is performed at step S104, UCR and black (K) generation processing is carried out at step S105 to convert Y, M and C three color signals into Y, M, C and K four color signals. The converted Y, M, C and K four color signals are temporarily stored in a buffer memory (RAM) at step S106. It is checked at step S107 to see if the selection signal F is 0 or not. If it is "0", the output gamma correction table a shown in FIG. 5A is selected to perform input/output correction for the Y, M, C and K signals. At step S111 the error diffusion matrix is selected in accordance with the selection signal, the selected matrix having different error distribution coefficients. Since the selection signal is initially "0", the error diffusion matrix shown in FIG. 6A is selected. The binarization processing using the error diffusion method is carried out at step S112 using the selected matrix. The data are outputted to the buffer 105 at step S113. When the buffer 105 stores therein one line of data, the head driver 106 is driven to perform the first recording. The selection signal is set at "1" at step S114. The following processes are determined on the basis of the judgement obtained at step S115. If it is judged at step S107 that F is "1", then the flow advances to step S108. At step S108, the output gamma correction table b shown in FIG. 5B is selected if the image signal is Y or K, whereas the output gamma correction table shown in FIG. 5A is selected if the image signal is M or C. The data stored in RAM are subjected to the output gamma correction processing at step S106.

The selection signal takes on the value "1" at this time at step S111, so that the error diffusion matrix shown in FIG. 6B is selected. The binarization processing by the error diffusion method is carried out at step S112 using the selected matrix. The image data are outputted to the buffer 105 for the second time at step S113. When the buffer 105 stores therein one line of data, the head driver 106 is driven to perform the second recording. Since the selection signal then becomes "2" at step S114, the flow advances to step S116 in accordance with the judgement obtained at step S115. It is checked if the image data are completed at step S116. If all image data are completed, the flow advances to END.

FIGS. 9A and 9B show print examples according to the prior art and the first embodiment, wherein cyan density scale images are shown by way of example.

FIG. 9A shows a conventional print example wherein an image signal having 256 grey levels is binarized by the error diffusion method, and recorded on a recording sheet to have a density change linearity over 256 grey levels. At stages st1 to st4 at the highlighted portion among the 256 grey levels, the number of dots per 1 $mm^2$ on the recording sheet is assumed for the case of the recording density of 400 dpi. The dot diameter is about 90 μm.

In FIG. 9A, the number of dots at st1 is zero (white), at st2 one, at st3 two, and at st4 three. The reflection density (red filter density) of one cyan dot is 1.0 to 1.6.

With such recorded dots as shown in FIG. 9A, granules appear large and they become conspicuous as noise particularly in a highlighted portion.

The recorded dots according to the first embodiment are shown in FIG. 9B, wherein cyan ink is used, which has a low density, so that the reflection density of one dot becomes one half of the conventional. If the dispersion of recorded dots is proper, the number of dots per 1 $mm^2$ on a recording sheet is two at st2, four at st3, and six at st4. The average reflection densities at st2 to st4 are the same as those shown in FIG. 9A (the dot diameter being the same both in FIGS. 9A and 9B).

The space frequency of two-dimensionally arranged dots shown in FIG. 9B, becomes therefore two times as high as conventional. In the visual space frequency characteristics, it is said that the peak sensitivity is about 2 lines/mm. For example in the case of st3, the space frequency is 2 lines/mm at st3 in FIG. 9A so that granules become conspicuous, whereas the space frequency is 4 lines/mm at st3 in FIG. 9B so that granules are not conspicuous.

In addition, since the reflection density of dots shown in FIG. 9B is half that shown in FIG. 9A, granular noise is reduced by a lower reflection density amplitude.

The space frequency is made high and the density amplitude is lower in the case of recording dots shown in FIG. 9B, so that with both these effects being given, granular noise is considerably reduced.

The reflection density of one dot of cyan or magenta ink used in this embodiment is about 0.7 (reflection density at a solid image portion is about 0.8). This is because the reflection density necessary (about 1.4) for and sufficient for a solid image portion can be obtained in the multiple recording, and with the reflection density of one dot smaller than or equal to 0.8 (at the recording density of 300 to 400 dpi), as has been empirically confirmed.

The reflection density (blue filter density and visual density) of one dot of yellow or black ink used in this embodiment is about 1.2 (about 1.4 at a solid image portion).

The input/output characteristics (recorded image density relative to input signal level) of a cyan image in this embodiment are shown in FIG. 10.

A line a in FIG. 10 indicates the characteristic obtained at the first recording, and a line b at the second recording. The input/output characteristics of a magenta image are the same as FIG. 10.

With the conventional apparatus, if the dot diameter is too small, a space is generated between dots at the dark portion so that the image density is lowered and a white stripe appears, whereas if the dot diameter is too large, the ink absorbing ability of a recording sheet is saturated so that unevenness of an image density or insufficient fixation occurs. The optimum dot diameter for the conventional apparatus has been set at 1.2 P to 1.5 P where P, is dot pitch. In the twice-recording of this embodiment, the dot diameter is preferably set at 0.9 P to 1.2 P.

The reason why a good image quality is obtained with the above dot diameter is that the diameter of the first recorded dot is increased by about 30% by the second recorded and superposed dot during the twice-recording at the halftone to dark portion, to thereby optimize the resultant dot diameter and avoid unevenness of an image density and fixation failure.

Also, in this embodiment, it is preferable to set the reflection density of one dot during the twice-recording at 0.5 to 0.8. In this case, the reflection density at a solid image portion is 0.6 to 0.9 at the first recording, and the reflection density at the solid image portion after the twice-recording becomes 1.1 to 1.5

In this embodiment, although the two error diffusion matrices are used in common for both cyan and magenta in the multiple recording, matrices may be used differently for cyan and magenta. With such arrangement, the superposition between cyan and magenta may be made small to thereby obtain a better image quality with respect to granular noise and color reproduction.

From the same reason, the error diffusion matrix for binarization processing may be differently used for yellow and black to thus allow different dispersion of dots.

A more-than-double, eq., three-time, recording may be easily applied instead of the twice-recording of this embodiment. In the three-fold recording, the reflection density of one dot of cyan or magenta ink is set at 0.4 to 0.6. The dot diameter is preferably 0.7 P to 1.0 P. Three coefficients of the error diffusion matrix are selected in correspondence with three recordings of cyan or magenta.

This multiple (three-times) recording allows a better image quality with respect to granular noise, than that of the twice-recording.

According to the first embodiment described above, cyan and magenta data relatively conspicuous at the light image portion are subjected to the multiple recording by using ink of low density, to thereby considerably improve the image quality at the image highlighted portion. In addition, only ink of low density is used for cyan and magenta data, and only ink of high density for yellow and black data, so that generation of stripes at the boundary between inks of high and low densities can be avoided. Further, although inks of high and low densities are used in accordance with the color of data, the binarization processing is not required to be changed in accordance with the color of data, thereby simplifying the hardware scale and computer programs.

(Second Embodiment)

Figures 11, 13A, 13B:
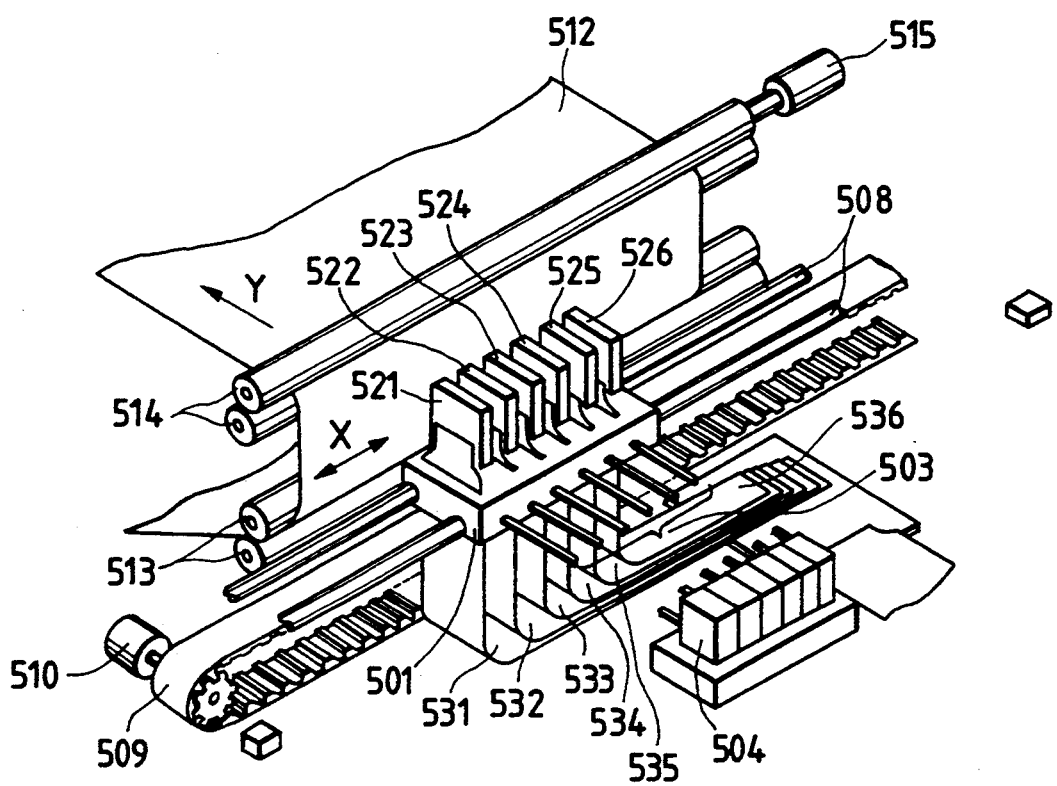
FIG. 11 is a perspective view of a full color ink jet recording apparatus of a carriage moving type according to a second embodiment of the present invention.
FIGS. 13A and 13B show error diffusion matrixes used in binarization processing by the apparatus shown in FIG. 11.

FIG. 11 is a perspective view of a full color printer of a carriage moving type using the bubble jet recording method according to the second embodiment of this invention.

Referring to FIG. 11, recording heads 521 to 526 each having a multi-nozzle array (e.g., 128 nozzles) are mounted on a carriage 501. The recording heads 521 and 522 jet out cyan ink of low density, the recording heads 523 and 524 jet out magenta ink of low density, the recording head 525 jets out yellow ink of high density, and the recording head 526 jets out black ink of high density.

In this embodiment, the multiple recording as in the apparatus shown in FIG. 1 is not carried out, but cyan and magenta inks of low density are recorded on a recording sheet at the same time during a single movement of the carriage. The two recording heads jetting out the same color ink of low density are only for cyan and magenta, the reason for this being the same as described with the first embodiment.

The control of the apparatus shown in FIG. 11 is carried out in the same manner as described with the block diagram shown in FIG. 7.

In the similar manner to the first embodiment, error diffusion matrices having different error distribution coefficients are selected for each of the cyan and magenta two recording heads, to thereby perform binarization processing. The recording dots recorded at the same time are controlled so as not to be superposed upon one upon another at the light image portion.

In this embodiment, the reflection densities of each dot of the recording head jetting out the same color ink may differ more or less. However, in order to obtain a good image quality, it is preferable to maintain the difference of the reflection densities no greater than about 0.3.

Figure 12:
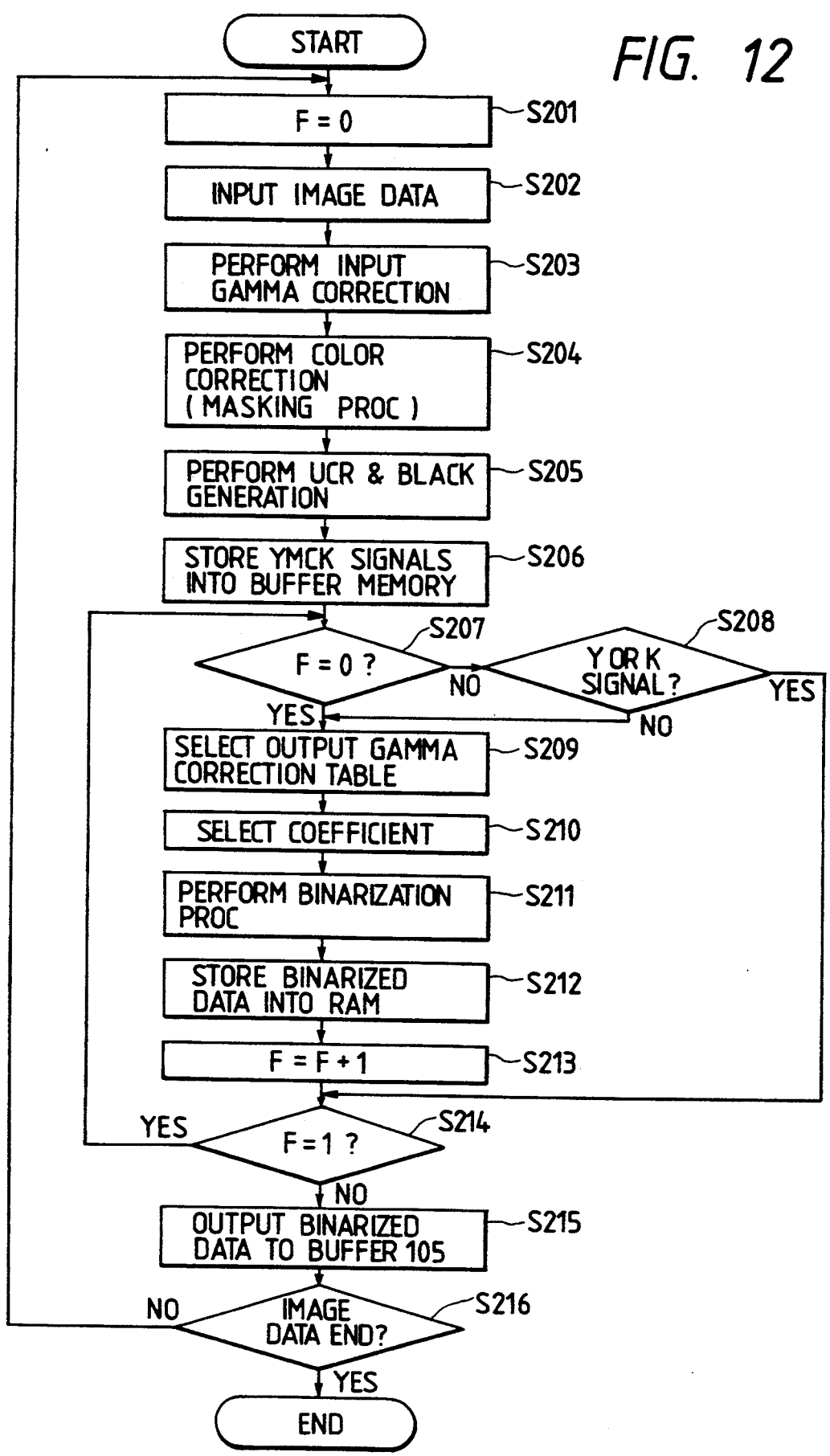
FIG. 12 is a flow chart illustrating the image signal processing of the apparatus shown in FIG. 11.

FIG. 12 is a flow chart showing the image signal processing by the apparatus shown in FIG. 11.

Steps S201 to S206 correspond to steps S101 to S106 shown in FIG. 8. If the selection signal is "0" at step S207, Y, M, C and K four color data are corrected by using the gamma correction table shown in FIG. 5A and are thereafter subjected to binarization processing at step S211. The binarization results are stored in RAM at step S212. If the selection signal is "1" at step S207, i.e., if it is the second processing, Y and K data are not subjected to binarization processing, and only M and C data are subjected to binarization processing. In this case, an error diffusion matrix different from that used at the first processing is selected at step S210. The binarization results are stored in RAM at step S212. After completion of the second processing, the binary data are outputted from RAM to the buffer 105 at step S215. When one line of binary data are stored in the buffer 105, corresponding drive signals are supplied to the recording heads.

As described above, M and C binary data are recorded by using two recording heads jetting out inks of low density, and Y and K binary data are recorded by using one recording head jetting out ink of high density.

(Third Embodiment)

In the third embodiment, in place of the two error diffusion matrices in the second embodiment which have different coefficients and used for binarization processing relative to the two recording heads for cyan and magenta, two error diffusion matrices are used which have different matrix sizes and different error distribution coefficients from those shown in FIGS. 13A and 13B.

Figure 14:
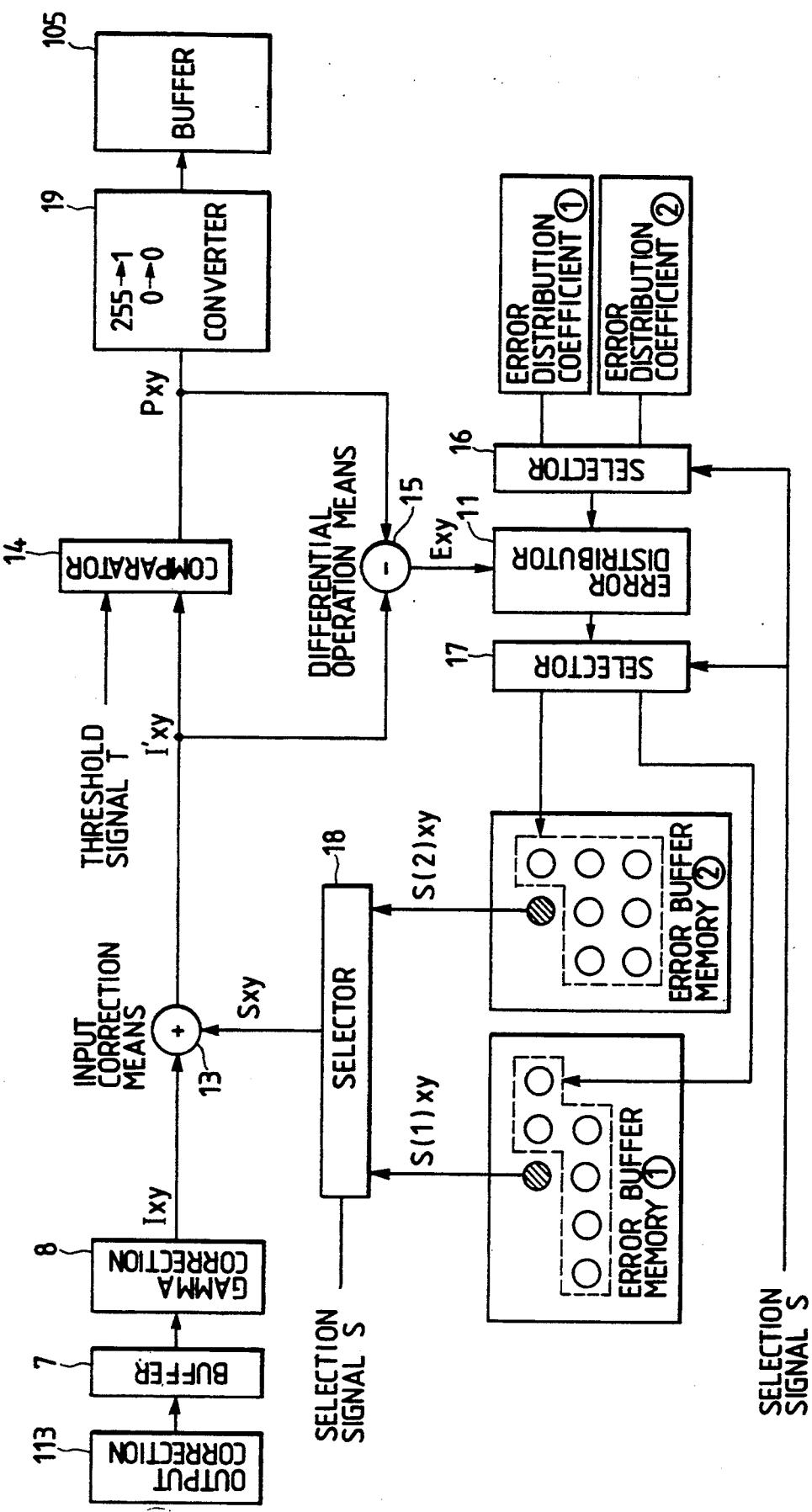
FIG. 14 is a block diagram showing the processes carried out by the error diffusion method used in binarization processing according to a third embodiment.

FIG. 14 illustrates the error diffusion processing used for halftone representation of this embodiment, which is slightly modified from that shown in FIG. 4. A similar binarization processing to the error diffusion method described with FIG. 4 is carried out. Only the different function therefrom will be described. Although only a single color circuit is shown in FIG. 14, similar circuits are used for the other three colors.

In accordance with a selection signal S, a selector 16 selects either of the distribution coefficients, ① or ②. In this embodiment, the sizes of the diffusion matrices are different so that the necessary capacities of buffer memories are also different. Consequently, according to the selection signal S, a selector 17 selects either an error buffer memory ① or ② corresponding to the diffusion matrix size.

Similarly, in accordance with the selection signal S, a selector 18 selects either $S(1)_{xy}$ or $S(2)_{xy}$ as the signal to be inputted to an input correction means 13.

As described above, by changing the size and coefficients of the error diffusion matrix, the super-position of dots is further avoided, to thereby obtain a good image quality with respect to granular noise.

In FIG. 14, in the first processing of C and M signals, the error distribution coefficient ① (FIG. 13A), error buffer memory ① and $S(1)_{xy}$ are selected. In the second processing, the error distribution coefficient ②(FIG. 13B), error buffer memory (2) and S(2)$_{xy}$ are selected.

(Fourth Embodiment)

The apparatus according to the fourth embodiment will be described. The apparatus is in general the same as shown in FIG. 11 and FIG. 2.

Figure 15:
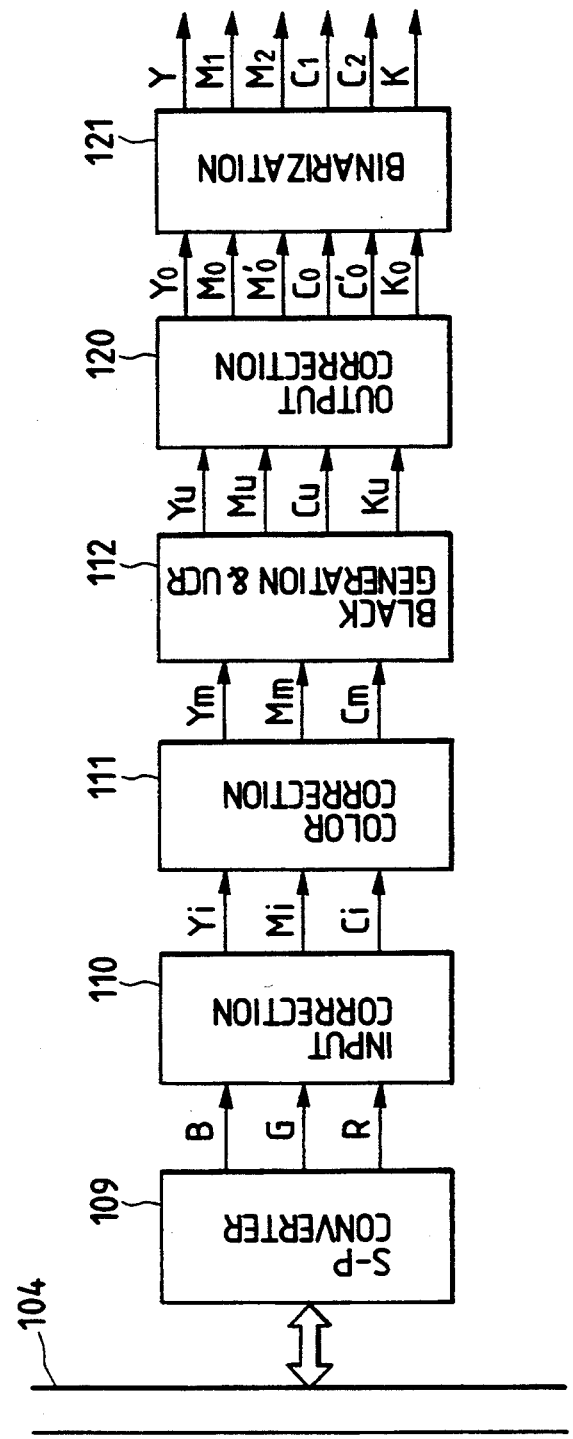
FIG. 15 is a block diagram showing image signal processing according to a fourth embodiment.

The image processor for processing image signal in the apparatus of the fourth embodiment is shown in the block diagram (partial view) of FIG. 15. Like elements to those shown in FIG. 3 are represented by identical reference numerals.

Referring to FIG. 15, Y, M, C and K four color multilevel signals after the black (K) signal generation and UCR processing are subjected to output gamma correction at the output correction unit 120. Output gammas for C and M are arranged to be set in accordance with the two recording heads for each C and M. The six multilevel signals outputted from the output correction unit 120, i.e., C(x2), M(x2), Y(x1) and K(x1), are subjected to binarization processing at binarization unit 121.

Figure 16:
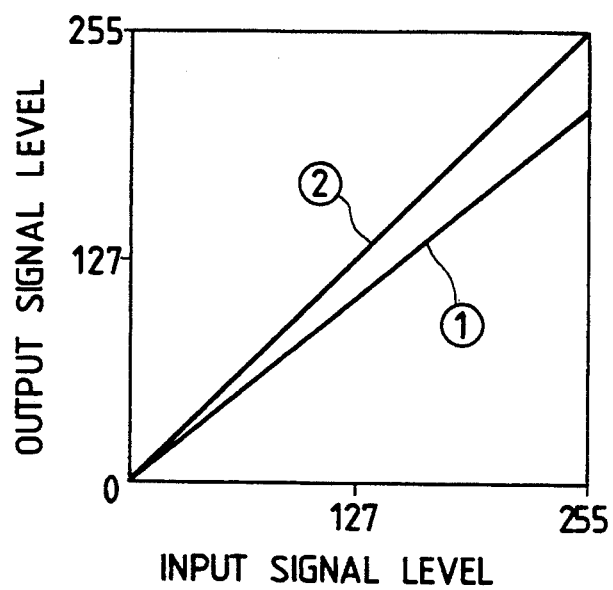
FIGS. 16 and 17 illustrate the input/output characteristics of a cyan image in the apparatus of the fourth embodiment.

The input/output characteristics of an image recorded with C and M two recording heads are arranged to have different gammas as shown at lines ① and ② in FIG. 16. With such arrangement, even the same input signal to the recording heads has different output signal levels at the output correction unit. Therefore, even if the binarization parameters such as the error distribution coefficient and matrix size of the error diffusion matrices in the binarization processing unit 121 are the same, the dots recorded in accordance with the outputs from the binarization processing unit are not superposed upon one another or are superposed only to a small extent at the light image portion.

Figure 17:
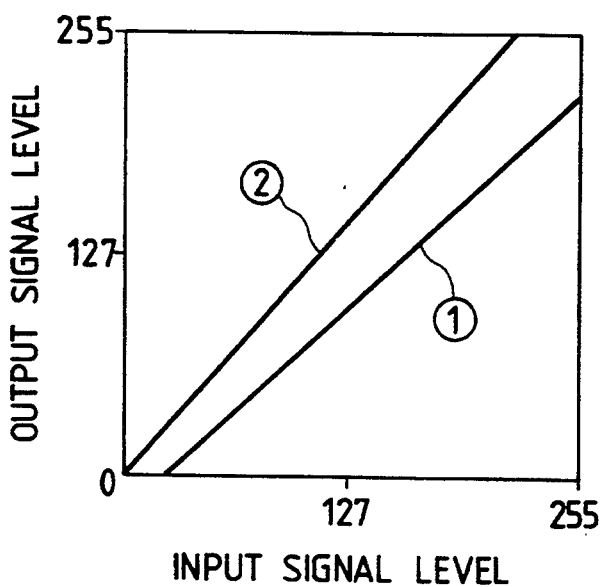

Instead of the input/output characteristics indicated at lines ① and ② in FIG. 16, those indicated at ① and ② in FIG. 17 may be used. Various other modified input/output characteristics may also be used.

The control of the fourth embodiment by using the CPU will be described below.

Figure 18:
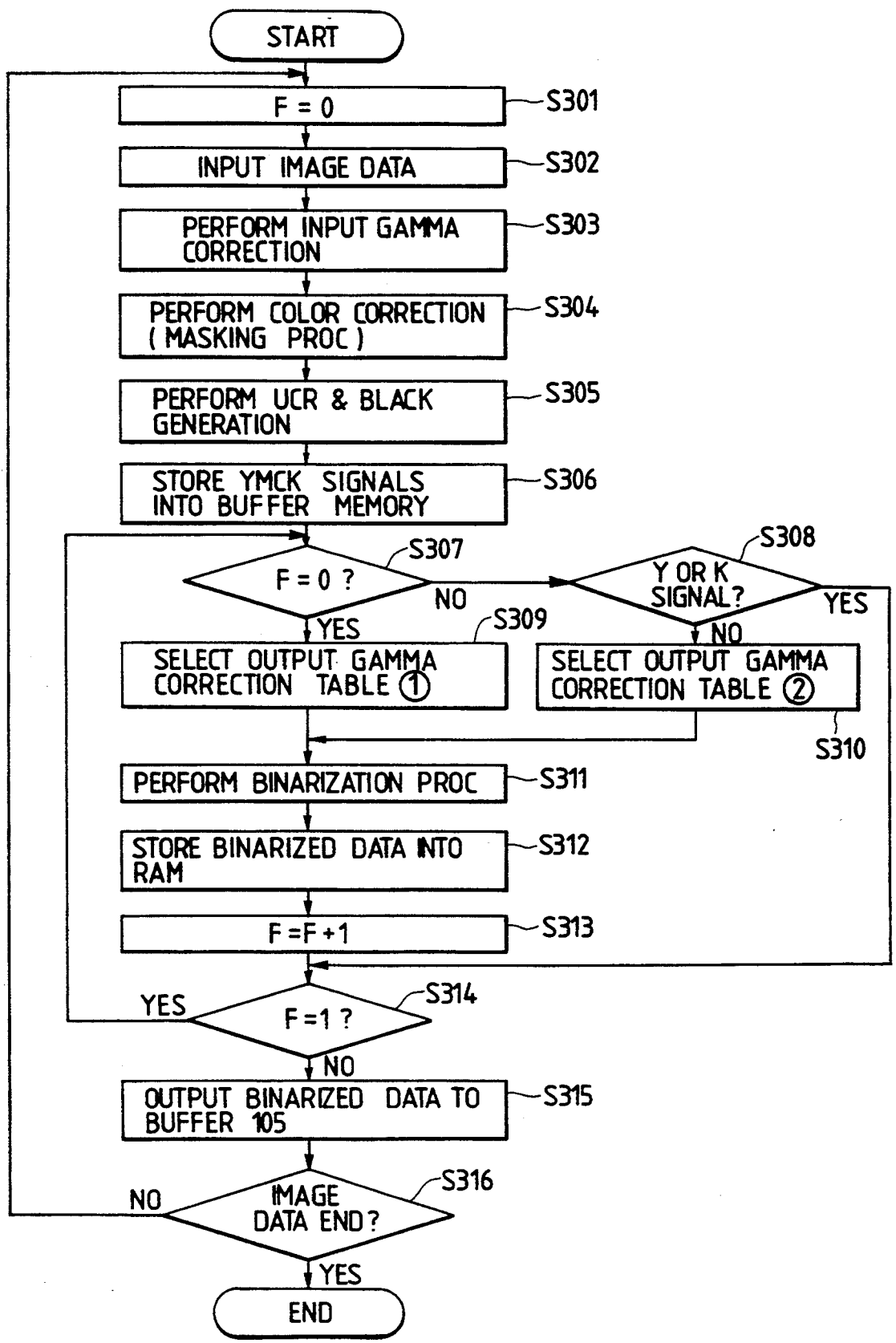
FIG. 18 is a flow chart showing image signal processing according to the fourth embodiment.

The flow chart illustrating the image signal processing in this embodiment is shown in FIG. 18. The flow chart contents are stored in RAM shown in FIG. 7 and executed by CPU 102. The flow of image signal processing is almost the same as that shown in FIG. 4, so only the different portion will be described.

The output gamma correction table shown in FIG. 16 or 17 is selected if the selection signal takes on at step S307, value "0" or "1", respectively. If the selection signal is "1", Y and K image signals are not subjected to binarization processing.

(Fifth Embodiment)

Figure 19:
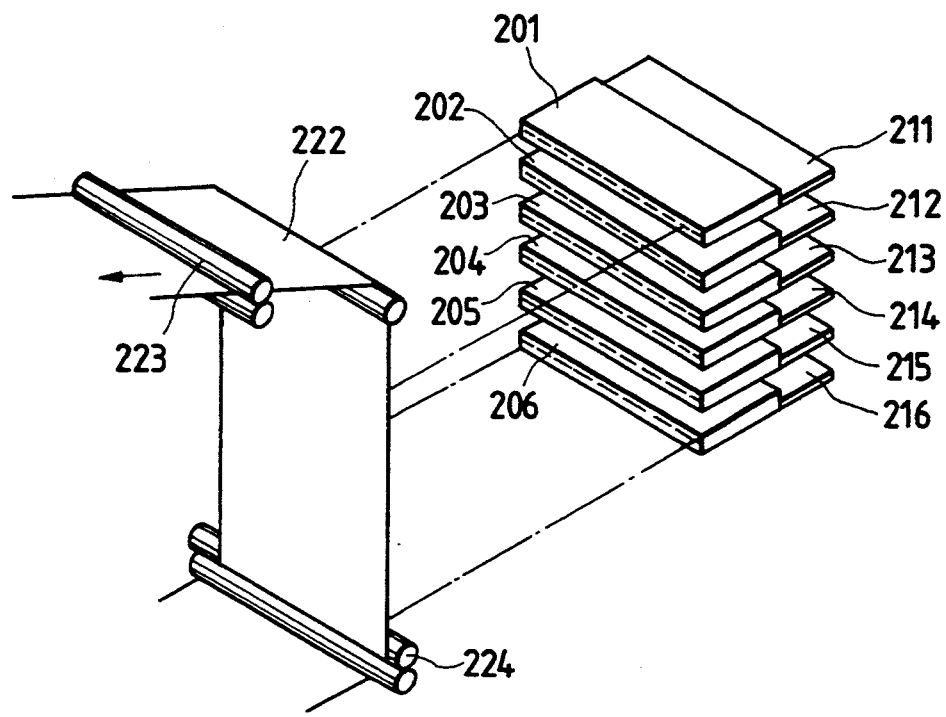
FIG. 19 is a perspective view showing the outline of a full color ink jet recording apparatus of a line printer type according to a fifth embodiment of this invention.

FIG. 19 shows the fifth embodiment of this invention, wherein the present invention is applied to a full color line printer using the bubble jet recording method.

There are mounted fixed recording heads 201 to 206 each having ink outlet ports corresponding in number to one line. The recording heads 201 and 202 jet out cyan inks of low density, and the recording heads 203 and 204 jet out magenta inks of low density. The recording heads 205 and 206 jet out yellow and black inks of high density, respectively. Drive signals are supplied via cables 211 to 216 to the recording heads 201 to 206. A recording medium 222 is fed in the direction indicated by an arrow by the feed roller pairs 223 and 224.

The image processor of the embodiment apparatus is similar to that shown in FIGS. 2 and 3, and the binarization processing is carried out by the error diffusion method.

Figure 20:
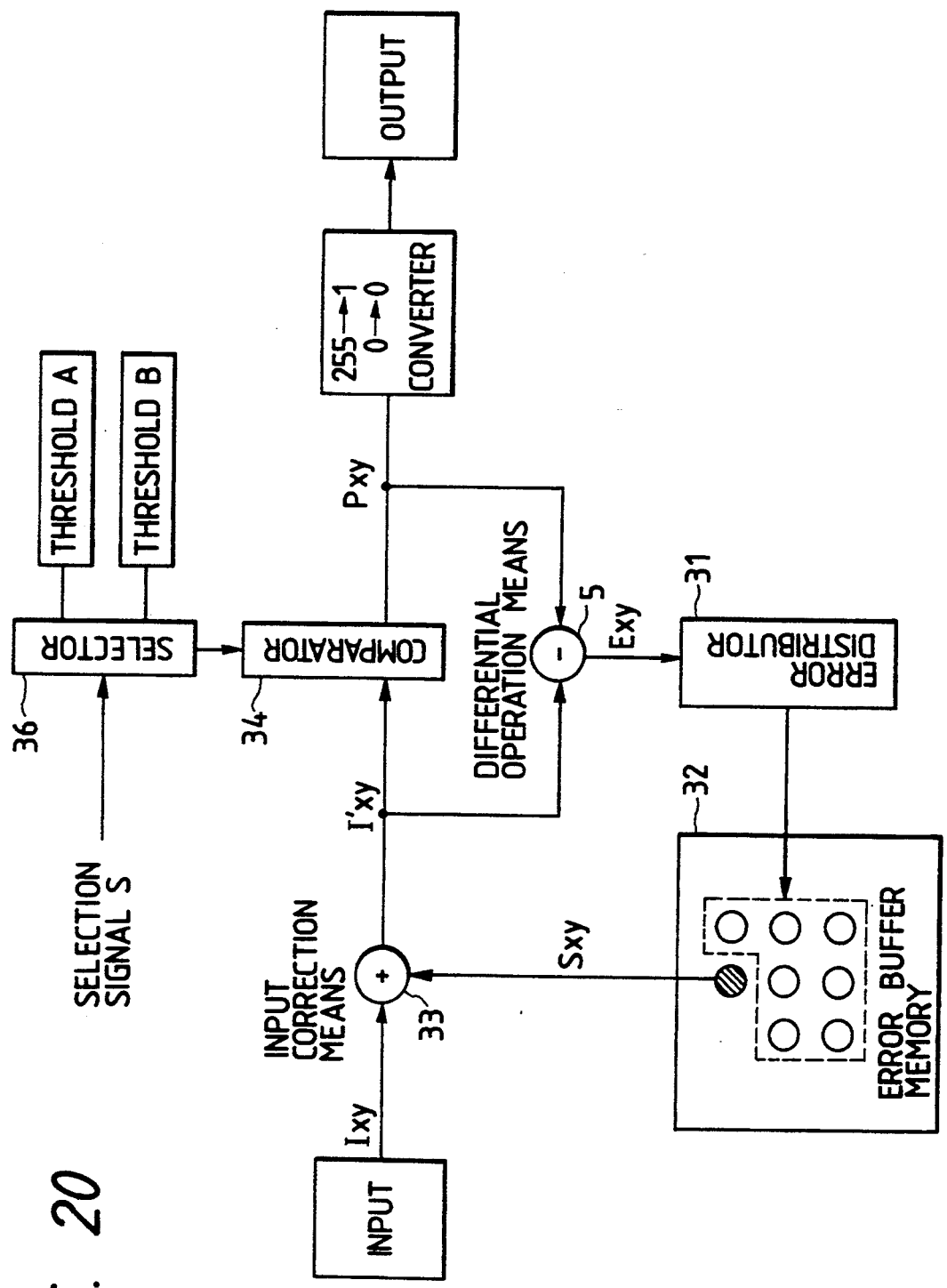
FIG. 20 is a block diagram showing the processes carried out by the error diffusion method used in binarization processing by the apparatus shown in FIG. 19.

FIG. 20 is a block diagram illustrating the binarization processing using the error diffusion method according to this embodiment. FIG. 20 shows the circuit for a single color. Similar circuits are used for the other three colors. In accordance with the selection signal S, a selector 36 selects one of two threshold levels (e.g., 64th level and 192nd level among 0 to 255 levels) in correspondence with C and M two recording heads. The binarization processing is carried out using the selected threshold value. Dots recorded by two recording heads for each color are arranged not to be superposed upon one another or to be superposed only to a small extent, thereby obtaining a good image quality with respect to granular noise.

(Sixth Embodiment)

Figure 21:
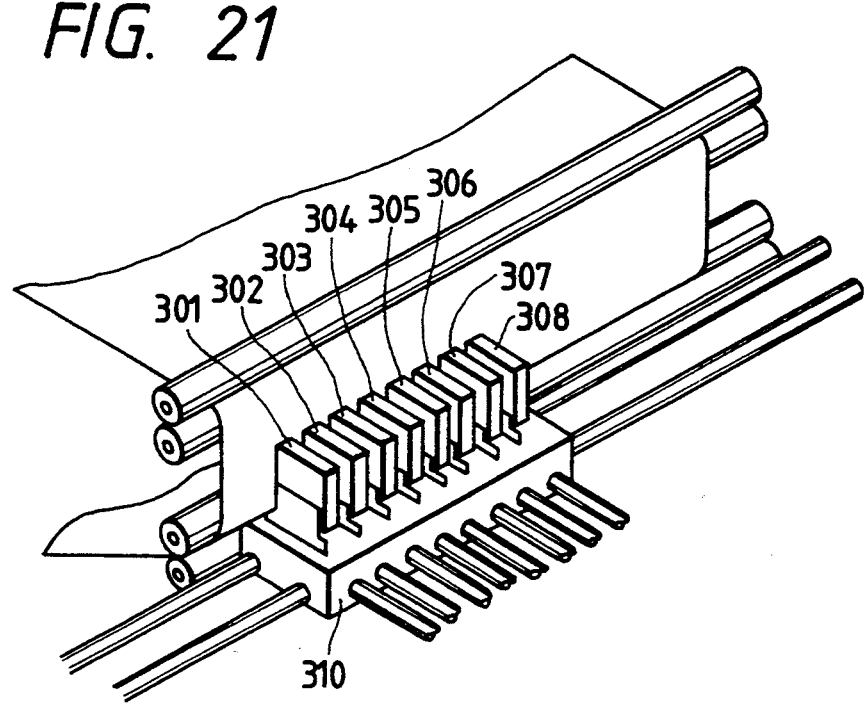
FIG. 21 is a perspective view showing the outline of a full color ink jet recording apparatus of a carriage moving type according to a sixth embodiment of this invention.

FIG. 21 shows the sixth embodiment apparatus of this invention, wherein the invention is applied to a full color printer (only the main part is shown) of a serial scan type using the bubble jet recording method.

Referring to FIG. 21, recording heads 301 to 308 each having a multi-nozzle array are mounted on a carriage 310. The recording heads 301, 302 and 303 jet out cyan inks of low density, and the recording heads 304, 305 and 306 jet out magenta inks of low density. The recording heads 307 and 308 jet out yellow and black inks of high density, respectively.

Figure 22:
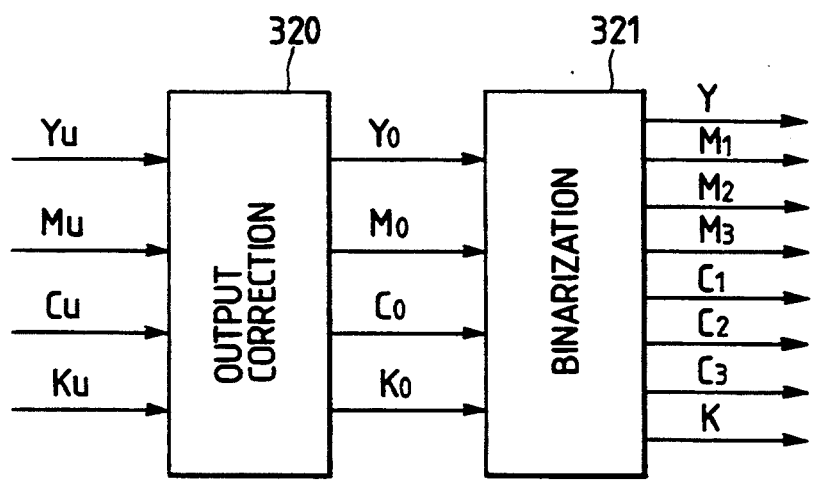
FIG. 22 is a block diagram showing image signal processing by the apparatus shown in FIG. 21.

The block diagram of the image processor of this embodiment apparatus is shown in FIG. 22. In FIG. 22, Y, M, C and K multilevel signals outputted from the output correction unit 320 are subjected to the binarization processing using the error diffusion method at the binarization unit. The serial-parallel converter 109 to the black generation and UCR processing unit are the same as those shown in FIGS. 3 and 15, so that they are omitted in FIG. 22.

Figure 23:
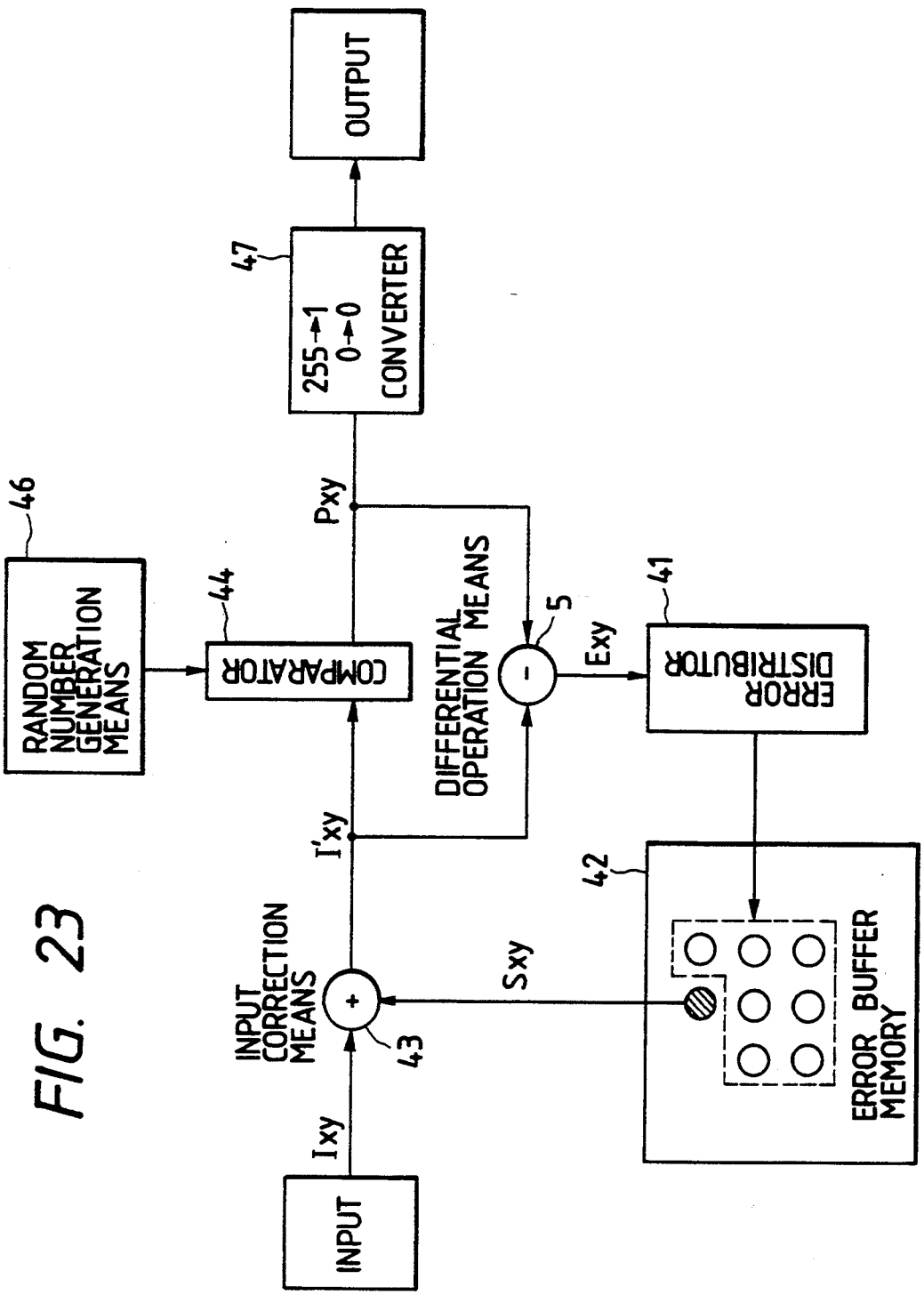
FIG. 23 is a block diagram showing the processes carried out by the error diffusing method used in binarization processing by the apparatus shown in FIG. 23.

FIG. 23 is a block diagram illustrating the binarization processing using the error diffusion method according to this embodiment. FIG. 23 shows a circuit for a single color, similar circuits being used for the other three colors.

By setting random number threshold values with a random number generation means 46, dots recorded by three recording heads for C or M are controlled so as not to be superposed upon one another or to be superposed to a small extent.

The reflection density (complementary color filter density) of one dot recorded by the C or M recording head is set at about 0.5, the reflection density at the solid image portion becoming about 1.4.

It is preferable that the reflection density of one dot recorded by the C or M recording head is set at 0.4 to 0.6. The reflection density at the solid image portion recorded with three recording head at a time for C or M becomes 1.2 to 1.5.

Finer and smoother granular noise can be obtained as compared with the first to fifth embodiment.

(Seventh Embodiment)

Figure 24:
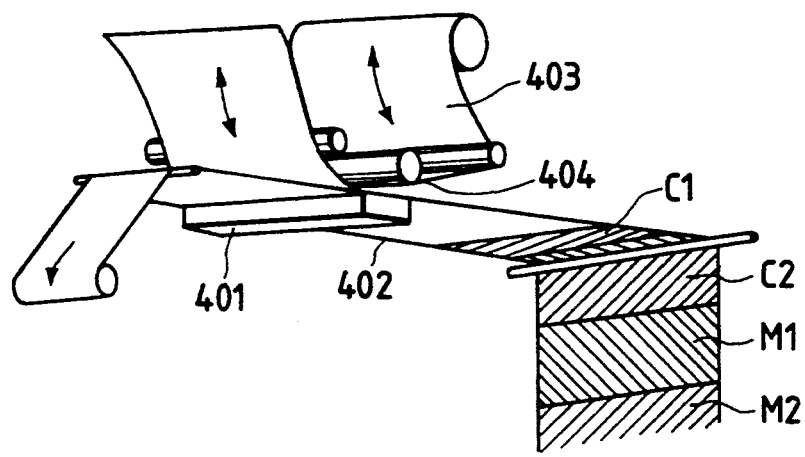
FIG. 24 is a perspective view of an apparatus according to a seventh embodiment of this invention.

FIG. 24 shows the seventh embodiment apparatus of this invention, wherein the invention is applied to a thermal transfer recording apparatus of a frame sequential type using the line thermal head.

Reference numeral 401 represents a thermal head, 402 a three color ink sheet, 403 a recording sheet, and 404 a platen roller. The ink sheet 402 has ink transfer surfaces including cyan C1 and C2, magenta M1 and M2, and yellow Y (not shown), these surfaces corresponding to five full color record pages. The reflection density of one dot transferred on a recording sheet is about 0.8 for cyan C1 and C2 and magenta M1 and M2, and that of yellow is about 1.4.

For the full color recording, in the similar manner to the first embodiment, cyan binary data are generated with the image processor using the error diffusion method, in accordance with each color image signal from a signal source. The random number threshold values are used for the first and second recordings of the binary data during the multiple recording, so as not to superpose the dots upon one another. The first recording of the binary data is carried out with the recording head 401 while feeding by one page amount the recording sheet 403 and the cyan C1 of the ink sheet 402. Thereafter, the recording sheet 403 is fed by one page amount back to the original position to carry out the second recording with the recording head 401 while feeding the recording sheet and cyan C2 of the ink sheet 402.

Next, the above-described multiple recording is performed for M. Since Y is not so conspicuous, the recording is carried out once without the multiple recording.

In the above manner, a full color image can be recorded on a recording sheet, with a good image quality with respect to granular noise.

In the above embodiments, the error diffusion method (substantially the same as the average error minimum method) has been used as the binarization method. The invention is not limited thereto, but it is apparent that the intra-mesh pixel distribution method, multiple division quantization method, MECCA method, CAPIX method and the like may also be used.

In the above embodiments, in order that dots recorded by a plurality of recording heads for the same color ink by using the error diffusion method are not superposed one upon another or superposed to a small extent, one or a combination of the following methods are used.

(1) Parameters of an error diffusion matrix such as error distribution coefficients or size are changed.
(2) Random numbers are used as binarization threshold values.
(3) The level of a binarization threshold value is changed.
(4) A gamma is changed at the output correction unit independently for each recording head for the same color.

As described so far, according to the embodiments of this invention, cyan and magenta data relatively conspicuous at the light image portion are subjected to the multiple recording by using ink of low density, to thereby considerably improve the image quality at the image highlighted portion. In addition, only ink of low density is used for cyan and magenta data, and only ink of high density for yellow and black data, so that generation of stripes at the boundary between inks of high and low densities can be avoided. Further, although inks of high and low densities are used in accordance with the color of data, the binarization processing is not required to be changed in accordance with the color of data but can be carried out with fixed threshold values, thereby simplifying the hardware scale and computer programs.

In the above embodiments, the description has been made using as an image input apparatus the host computer and image scanner for reading a color original. The invention is also applicable to the case where a film projector or the like is used to read data from a color film, or to the case where data of a still image are inputted from a still video recorder.

As appreciated from the foregoing description of the recording apparatus of this invention, it is possible to prevent granular noise from becoming conspicuous at the light image portion to thereby realize a good image quality. In addition, it is possible to prevent generating a pseudo-contour and to reproduce a smooth halftone image.

We claim:

1. An image recording apparatus comprising:
input means for inputting image data representing n pixels, n being a natural number;
binarization means for generating a plurality of sets of binarized data, each said set representing each of said n pixels, by performing a plurality of binarization processings on the image data input from said input means; and
recording means for performing a plurality of recording processings relative to said n pixels of the input image data by using the plurality of binarized data generated by said binarization means,
wherein said input means inputs first and second color image data, said binarization means generates a plurality of binarized data by performing a plurality of binarization processings on said first color image data, and said recording means performs the plurality of recording processings in accordance with said plurality of binarized data, and
wherein said recording means performs a recording processing on said first color image data with a recording medium of lower density than that used for recording said second color image data.

2. An image recording apparatus comprising:
input means for inputting first and second color image data;
quantization means for quantizing the first and second color image data input from said input means; and
recording means for recording with a recording medium an image corresponding to the input first and second color image data, in accordance with the processing results obtained by said quantization means,
wherein said recording means records the image with a recording medium having a different density level between said first and second color image data, and if the image is recorded with the recording medium having a lower density level, a plurality of recording processings are carried out on said input first or second color image data.

3. An image recording apparatus according to claim 2, wherein said quantization means performs a binarization processing on said first and second color image data to correct error data generated during the binarization processing.

4. An image recording apparatus according to claim 2, wherein said recording means performs a recording processing on said first color image data with a recording medium of lower density than that used for recording said second color image data.

5. An image recording apparatus according to claim 2, wherein said quantization means performs a plurality of quantization processings on the first color image data, and said recording means performs a plurality of recording processings in accordance with the data obtained in said plurality of quantization processings.

6. An image recording apparatus according to claim 5, wherein said quantization means performs a plurality of quantization processings on said first or second color image data while changing the quantization processing parameters.

7. An image recording apparatus, comprising:
input means for inputting image data of plural pixels;
first image formation means for generating first binary data for forming a first image, from the image data input by said input means;
second image formation means for generating, from the same image data used in generating the first binary data for forming the first image, second binary data for forming a second image, the second binary data consisting of binary data which is different from the first binary data for forming the first image; and
record means for recording images on the basis of the first and second binary data,
wherein said record means performs recording of both the first and second images using a recording medium having one density,
said input means inputs first color image data and second color image data, and said first and second image formation means generate the first and second binary data from the first color image data, and
wherein said record means uses a different-density recording medium respectively in a recording of the first color image data and a recording of the second color image data.

8. An apparatus according to claim 7, wherein said first and second image formation means respectively have first and second binarization means for binarization-processing the input image data.

9. An apparatus according to claim 8, wherein said first and second binarization means, in executing the binarization process, correct errors generated during binarization of the input image data.

10. An apparatus according to claim 7, wherein a dot formation position in recording based on the first image is different from a dot formation position in recording based on the second image.

11. An apparatus according to claim 10, wherein said record means performs recording of the first and second images using a relatively low-density ink.

12. An image recording method wherein an image input by input means is processed and image recording is performed by record means, comprising the steps of:
inputting image data of plural pixels;
generating first binary data for forming a first image, from the input image data;
generating second binary data for forming a second image, the second binary data consisting of binary data which is different from the first binary data for forming the first image, from the same image data used in generating the first binary data in said first image forming step; and
recording images on the basis of the first and second binary data,
wherein the record means performs the recording of the first and second images using a recording medium having one density, and
wherein, in said input step, first color image data and second color image data are input, and in said first and
second image formation steps the first and second binary data are generated from the first color image data, and
wherein, in said recording step, a different density recording medium is used respectively in a recording of the first color image data and a recording of the second color image data.

13. An image recording method comprising the steps of:
inputting first and second color image data;
quantizing the first and second color image data input in said inputting step; and
recording with a recording medium an image corresponding to the input first and second color image data, in accordance with the processing results obtained in said quantizing step,
wherein, in said recording step, the image is recorded with a recording medium having a different density level between said first and second color image data, and if the image is recorded with the recording medium having a lower density level, a plurality of recording processings are carried out on the input first or second color image data.

* * * * *

UNITED STATES PATENT AND TRADEMARK OFFICE
CERTIFICATE OF CORRECTION

PATENT NO. : 5,406,392
DATED : April 11, 1995
INVENTOR(S) : TAKAO AOKI, ET AL.

Page 1 of 4

It is certified that error appears in the above-indentified patent and that said Letters Patent is hereby corrected as shown below:

COLUMN 1

Line 23, "sub-divided" should read --subdivided--.
Line 24, "fixed size" should read --fixed-size--.
Line 35, "increase" should read --made-- and "make" should read --increase--.
Line 36, "pixel" should read --pixel,--.
Line 37, "deteriorate" should be deleted.
Line 42, "pixels," should read --pixels--.
Line 43, "pixel" should read --pixel,--.
Line 52, "and" should be deleted and "to" should read --in--.
Line 55, "noises" should read --noise--.
Line 56, "become" should read --becomes--.

COLUMN 2

Line 5, "pseudo contour" should read --pseudo-contour--.
Line 8, "unnatural" should read --an unnatural--.
Line 14, "that there" should read --wherein--.
Line 21, "psuedo-contour" should read --pseudo-contour--.
Line 31, "psuedo-contours" should read --pseudo-contours--.
Line 37, "on" should read --of-- and "of" should read --on--.
Line 53, "psuedo-contour form" should read --pseudo-contour from--.
Line 57, "psuedo-contour." should read --pseudo-contour.--.
Line 60, "different color" should read --different-color--.

COLUMN 3

Line 21, "embodiment" should read --above embodiment" and "invention" should read --invention;--.

UNITED STATES PATENT AND TRADEMARK OFFICE
CERTIFICATE OF CORRECTION

PATENT NO. : 5,406,392
DATED : April 11, 1995
INVENTOR(S) : TAKAO AOKI, ET AL.

It is certified that error appears in the above-indentified patent and that said Letters Patent is hereby corrected as shown below:

COLUMN 3

Line 56, "FIG. 23;" should read --FIG. 21;--

COLUMN 4

Line 2, "(e.g., an" should read --(an-- and
"multiple" should read --multiple nozzles, e.g.,--.
Line 15, "sub scan," should read --sub-scan,--.
Line 22, "carriage" should read --the carriage--.
Line 27, "superpose" should read --superposed--.

Line 50, "of" (second occurrence) should be deleted.
Line 53, "three color" should read --three-color--.
Line 62, "color" should read --colors--.

COLUMN 5

Line 14, "three color" should read --three-color--.
Line 29, "four color" should read --four-color--.
Line 52, "of" should be deleted.
Line 65, "table a" should read --table--.
Line 68, "table R" should read --table--.

COLUMN 6

Line 2, "table b" should read --table--.
Line 29, "matrix)" should read --matrix).--.
Line 42, "objective" should read --object--.
Line 56, "$e_{xy}=I'_{xy}-P_{xy}$" should read --$E_{xy}=I'_{xy}-P_{xy}$--.

UNITED STATES PATENT AND TRADEMARK OFFICE
CERTIFICATE OF CORRECTION

PATENT NO. : 5,406,392
DATED : April 11, 1995
INVENTOR(S) : TAKAO AOKI, ET AL.

Page 3 of 4

It is certified that error appears in the above-indentified patent and that said Letters Patent is hereby corrected as shown below:

COLUMN 7

Line 29, "judgement" should read --judgment--.
    Line 38, "time" should read --time,--.
    Line 48, "judgement" should read --judgment--.
    Line 57, "density change" should read --density-change--.
    Line 67, "noise" should read --noise,--.

COLUMN 8

Line 24, "that" should read --that,--.
    Line 31, "recording," should read --recording (specifically, two recordings suffice),--.
    Line 55, "1.5 P where P," should read --1.5 P, where P--.

COLUMN 9

Line 13, "eq.," should read --e.g.,--.
    Line 22, "noise," should read --noise--.

COLUMN 10

Line 52, "the" should read --two--.
    Line 63, "super-position" should read --superposition--.

COLUMN 11

Line 34, "another" should read --another,--.
    Line 44, "RAM" should read --the RAM--.
    Line 49, "on" should read --on,--.

UNITED STATES PATENT AND TRADEMARK OFFICE
CERTIFICATE OF CORRECTION

PATENT NO. : 5,406,392
DATED : April 11, 1995
INVENTOR(S) : TAKAO AOKI, ET AL.

It is certified that error appears in the above-indentified patent and that said Letters Patent is hereby corrected as shown below:

COLUMN 13

Line 2, "three color" should read --three-color--.
Line 43, "one upon" should read --upon one--.

COLUMN 16

Line 25, close up right margin.
Line 29, "different density" should read --different-density--.

Signed and Sealed this

Twenty-ninth Day of August, 1995

Attest:

BRUCE LEHMAN

Attesting Officer

Commissioner of Patents and Trademarks